Figure 1:
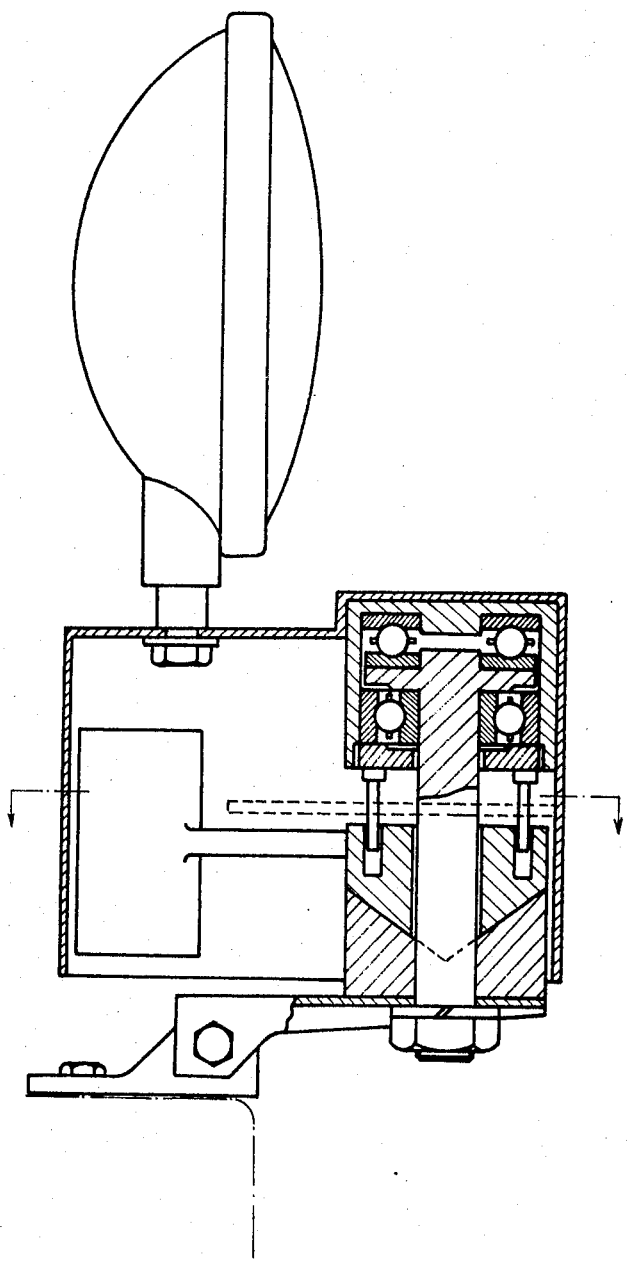

United States Patent [19]
Tomita et al.

[11] 4,217,627
[45] Aug. 12, 1980

[54] MOVABLE CAR HEADLIGHTS

[76] Inventors: Kazumi Tomita, 22-go, 5-ban, 1-chome, Tamatsu, Higashinari-ku, Osaka; Yoshitaka Fujiike, 400-banchi, Tamatsukuri-cho, Higashi-ku, Osaka, both of Japan

[21] Appl. No.: 931,440

[22] Filed: Aug. 7, 1978

[51] Int. Cl.$^2$ .......................... B60Q 1/08; B60Q 1/12
[52] U.S. Cl. ....................................................... 362/71
[58] Field of Search ....................... 362/71, 66, 67, 68, 362/70, 36, 37, 39, 40, 41, 55, 59, 42, 43

[56] References Cited

U.S. PATENT DOCUMENTS

| | | | |
|---|---|---|---|
| 827,969 | 8/1906 | Gardner et al. | 362/40 |
| 996,405 | 6/1911 | Green et al. | 362/40 |
| 1,071,814 | 9/1913 | Snyder et al. | 362/68 |
| 1,283,020 | 10/1918 | Ames | 362/39 |
| 1,408,068 | 2/1922 | Bliven et al. | 362/55 |
| 1,848,550 | 3/1932 | Rummel | 362/59 |
| 2,851,586 | 9/1958 | De Lorean | 362/71 |
| 3,434,108 | 3/1969 | Dawson | 362/66 |
| 4,118,765 | 10/1978 | Atsuchi | 362/71 |

FOREIGN PATENT DOCUMENTS

| | | | |
|---|---|---|---|
| 2207301 | 8/1972 | Fed. Rep. of Germany | 362/66 |
| 1489924 | 10/1977 | United Kingdom | 362/71 |

*Primary Examiner*—Teddy S. Gron
*Attorney, Agent, or Firm*—Wenderoth, Lind & Ponack

[57] ABSTRACT

A movable car-headlight device whereby headlights are capable, when the car is turned, of illuminating the direction in which the car is turned.

7 Claims, 3 Drawing Figures

MOVABLE CAR HEADLIGHTS

This invention relates to a car headlight and more particularly, to a movable car headlight device which, when turning the car, illuminates the area into which the car is turning.

Conventional headlights and auxiliary lights are generally fixed at a certain angle to the front of a car body for lighting up the area in front of the car. Therefore, upon turning the steering wheel to change the direction of travel of the car, the front-wheel forms an angle corresponding to the angle at which the steering wheel was turned in relation to the direction of travel of the car. Thus, the car body moves in a direction which is not being illuminated by the headlights and therefore poses a danger because it is turned into a dark area.

It is therefore an object of the present invention to provide a novel headlight device for cars, which is designed so that when turning the car it automatically directs a light in the direction in which the car is turned. More specifically, the movable car headlight device of the present invention comprises a perpendicular main axis fixed to a bracket mounted on an appropriate part of the car body; a receiving table through which the main axis passes; a rotating body with balance weights on either side attached to the main axis the body rotatable resting on the receiving table; and a casing with a lamp at its rear part rotatable supported at the upper end of the main axis. The casing is connected to the rotating body so as to allow the rotating body to rise or fall independently and co-rotates with the casing. The receiving table and the rotating body are adapted to contact each other in the form of a V-shaped wedge so that the rotating body is allowed to ride up from the contact surface as it is rotated due to centrifugal force exerted by the balance weights caused by the turning of the car, whereby the casing having a lamp is rotated and the rotating body is given a restoring force due to potential energy accumulated by riding up the V-shaped surface of the receiving table.

Figure 2:
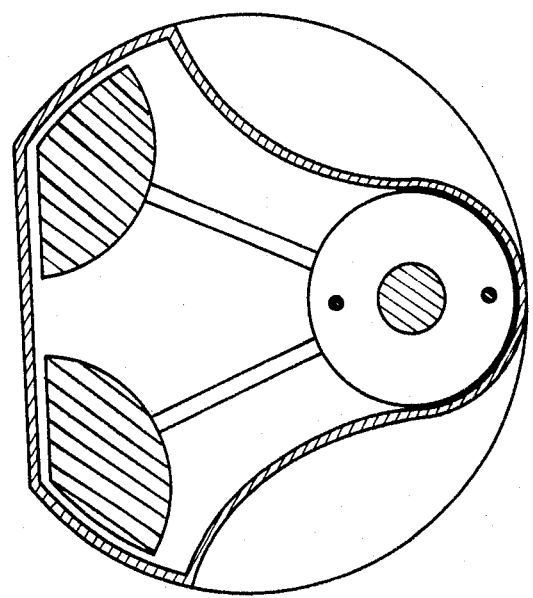
Figure 3:
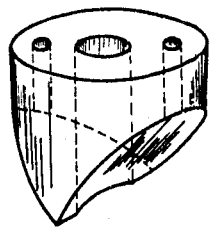
Figure 3:
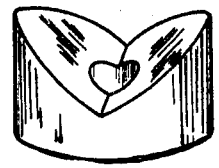

The nature and advantages of the present invention will be understood more clearly from the following description made with reference to the accompanying drawing, in which:

FIG. 1 is a longitudinal section of the car headlight device of the present invention, FIG. 2 is a cross section taken along the II—II line in FIG. 1, and FIG. 3 is a perspective view of the receiving table and the revolving body.

In the drawing, numeral 1 denotes a bracket which comprises a base 2 fixed to an appropriate part of a car body (a front bumper B, for example) and a supporting table 4 movably fixed to said base 2 by means of a bolt 3. A main axle 5 is fixed perpendicularly to the supporting table 4 by means of a nut 6. The main axis 5 passes through a receiving table 7 which is fixed to the supporting table 4 or to the lower part of the main axle 5. A rotating body 9 is fitted rotatable about the main axle 5 and rests on the receiving table 7. The upper surface of the receiving table 7 has a V-shaped notch 8 and the rotating body 9 has a corresponding V-shaped projection 10 at its lower part. Thus, a wedge-shaped contact surface A (FIG. 3) is formed by both the notch 8 and the projection 10. The angle of the contact surface A between the notch 8 and the projection 10 is determined so that when the rotating body 9 has a turning force exerted on it, it rides up from the notch 8 and thereby rotates.

Fitted to the upper end of the main axis 5 are radial bearings 11 and thrust bearings 12 which are supported by a supporting tube 13 which is fixed to the front part of a casing 14 which carries a sealed beam lamp 15 at its upper rear part. Ball-and-roller bearings are used in this embodiment but such bearings can be replaced by plain bearings or other universal bearings.

The above-described casing 14 also acts as a cover. Preferably, it is shaped in such a fashion that its cross section is substantially triangular, with a slight concavity at each of two of its sides facing forward in the direction of travel of the car, to which is fixed a fin 16. This fin 16, when the car is running, is subjected to air pressure and prevents the casing 14 from shaking due to vibration of the car body and other factors. As illustrated in FIG. 2, it is preferable that the three apexes of the casing 14 and the fin combine to lie in a circle.

The afore-mentioned rotating body 9 rotates when the car body changes its direction of travel. This turning is transmitted to the casing 14 but when the car body is restored to straight driving, the rotating body also returns to its original state immediately. By means of lever 17 the main axis 5 is connected to balance weights 18 which are preferably positioned away from the main axis or more specifically, at the apexes at the rear part of the casing 14. Inserting holes 19 are located in the surface of the rotating body 9 and pins 20 are provided which protrude from the under surface of the supporting tube 13 and are inserted in the holes 19. Thus, rotation of the rotating body 9 is transmitted through the supporting tube 13 to the casing 14 but the rotating body 9 is allowed to move up and down, independently of the supporting tube 13.

In the above described arrangement, while the car body is being driven in a straight direction the rotating body 9 is locked in the notch 8 of the receiving table 7 by its own weight and the weight of the balance weights 18 and therefore, the headlight is kept pointing in the straight direction of travel of the car. The lamp 15 normally points to the front but upon change of direction of travel of the car body, the balance weights 18 cause the rotating body 9 to rotate around the main axis 5 because of centrifugal force acting upon the weights. The lower part of the rotating body 9 which is normally locked in the receiving table 7 in V-shape 9 is rotated as it rides up from the receiving table 7. This rotation of the rotating body 9 causes the supporting tube 13 and the casing 14 to rotate by engagement with pins 20. By providing the lamp 15 at the rear of the main axis 5, the lamp 15 illuminates the direction opposite the transition caused by centrifugal force, namely, lights up the direction in which the car body is turned.

Thus, when the car body returns to straight driving and the balance weights 18 are freed from turning caused by centrifugal force, the rotating body 9 returns to its original position (at which point it makes contact with the receiving table) as it turns in a reverse direction due to its weight and the weight of the balance weights 18. In this embodiment, a lamp is mounted on the casing 14 but it is also possible to mount a lamp on a place other than the casing and both are connected by a connector.

According to the present invention, while the car body is traveling in a straight path the rotating body 9 is locked in the receiving table 7 by its weight and the weight of the balance weights 18. Therefore, the casing 14 is free from lateral movement due to vibration of the car body and the lamp 15 always points to the front. Upon a change of the direction of travel, the casing 14 carrying the lamp 15 is caused to rotate by the riding up rotation of the rotating body 9 in relation to the receiving table 7 due to centrifugal force acting on the balance weights. Therefore, a satisfactory turning force can always be obtained and even when the driving speed is comparatively slow, the lamp is capable of turning in the direction in which the car is turned thereby illuminating that area. Furthermore, when straight driving is resumed upon completing the turn, the rotating body immediately descends from its riding up position to its original position, resulting in the lamp being again directed to the front. Such movement is done automatically without the necessity of the driver's operation.

What is claimed is:

1. A movable car-headlight device located at an appropriate place on a car body, for automatically illuminating an area into which said car turns, which comprises:
   (a) bracket means mounted on a forward portion of said car for mounting said headlight device thereon;
   (b) receiving table means mounted on said bracket means, said receiving table means having a vertically extending opening therethrough and having a V-shaped wedge upper surface;
   (c) a rotating body rotatably supported on said receiving table means and having a vertically extending opening therethrough which is co-extensive with said opening in said receiving table means, the bottom portion of said rotating body being V-shaped complimentary to said V-shaped upper surface of said receiving table means for contacting and being supported by said V-shaped upper surface of said receiving table, said rotating body further having engaging means located on its upper surface;
   (d) lever means extending horizontally and angularly spaced from each other in a direction toward the rear of said car and attached to said rotating body and having weight balance means attached to the ends furthest from said rotating body;
   (e) axle means having a rod portion extending downward through said openings in said rotating body and said receiving table means and secured to said bracket;
   (f) casing means attached to said rotating body by said rotating body engaging means; and
   (g) a headlight mounted on said casing means whereby rotation of said headlight is caused by centrifugal force acting upon said weight balance means when said car is turned thereby causing said rotating body to turn and climb up said V-shaped surface portion, thereby rotating said casing means having said headlight mounted thereon, said headlight being rotated back to its original position once said car completes said turn and centrifugal force no longer acts on said weight balance means.

2. A movable car-headlight device located at an appropriate place on a car body, for automatically illuminating an area into which said car turns, which comprises:
   (a) bracket means mounted on a forward portion of said car for mounting said headlight device thereon;
   (b) receiving table means mounted on said bracket means, said receiving table means having a vertically extending opening therethrough and a V-shaped wedge upper surface;
   (c) a rotating body rotatably supported on said receiving table means and having a vertically extending opening therethrough which is co-extensive with said opening in said receiving table means, the bottom portion of said rotating body being V-shaped complementary to said V-shaped upper surface of said receiving table means for contacting and being supported by said V-shaped upper surface of said receiving table, said rotating body further having engaging means located on its upper surface;
   (d) lever means extending horizontally and angularly spaced from each other in a direction toward the rear of said car and attached to said rotating body and having weight balance means attached to the ends furthest from said rotating body;
   (e) axle means having a rod portion extending downward through said openings in said rotating body and said receiving table means and secured to said bracket means by a nut;
   (f) casing means having bearing means for securing said casing means to the upper portion of said axle means for preventing said axle means from dropping out through the bottom of said bracket means, said casing means having engaging members for engaging said engaging means on said rotating body; and
   (g) a headlight mounted on said casing means whereby rotation of said headlight is caused by centrifugal force acting upon said weight balance means when said car is turned thereby causing said rotating body to turn and climb up said V-shaped surface portion which in turn rotates said axle means and said casing means for rotating said headlight, said headlight being rotated back to its original position once said car completes said turn and centrifugal force no longer acts on said weight balance means.

3. A movable car headlight device as defined in claim 1 or 2 further comprising a headlight separate from said casing means and having a connector for fixedly connecting said headlight to said casing means.

4. A movable car headlight device as defined in claim 1 or 2 further comprising aerodynamic foil means attached to said device for preventing vibration and shaking of said device due to vibrations of said car when moving.

5. A movable car headlight device as defined in claim 2 wherein said bearing means are ball-and-roller bearings.

6. A movable car headlight device as defined in claim 2 wherein said bearing means are plain bearings.

7. A movable car headlight device as defined in claim 2 wherein said bearing means are universal bearings.

* * * * *